United States Patent Office 2,736,702
Patented Feb. 28, 1956

2,736,702

RESINOUS CONDENSATION PRODUCT OF FORMALDEHYDE, ALKALINE EARTH METAL SULFIDE, AND AN ALKYLATED MONOHYDRIC PHENOL

Herschel G. Smith, Wallingford, and Troy L. Cantrell, Drexel Hill, Pa., and John G. Peters, Audubon, N. J., assignors to Gulf Oil Corporation, Pittsburgh, Pa., a corporation of Pennsylvania No Drawing. Application July 17, 1952,
Serial No. 299,501

8 Claims. (Cl. 252—42.7)

This invention relates to new resinous products, and more particularly it is concerned with oil-soluble resins which are advantageously used in various mineral oil compositions as stabilizers, detergents, etc.

It is an object of this invention to provide a new and useful class of mineral oil soluble, permanently thermoplastic, resinous reaction products. A further object of this invention is to provide products of the character described which are particularly suitable for the compounding of lubricating oils and other mineral oil compositions.

These and other objects are achieved by the present invention wherein mineral oil soluble, metal and sulfur containing, permanently thermoplastic, resinous materials are obtained by condensing in an aqueous medium an alkylated monohydric phenol having at least one free reactive position in the nucleus, at least one alkyl group of such alkylated phenol containing at least four carbon atoms, formaldehyde and an alkaline earth metal sulfide, at least one mol of formaldehyde being employed for every two mols of the phenol, and at least one equivalent of the alkaline earth metal sulfide being employed for every two mols of the phenol.

The invention also includes the use of an alkaline earth metal hydroxide in place of some of the alkaline earth sulfide in the foregoing condensation, in which case sufficient of the sulfide is employed in relation to the hydroxide to yield not less than about 0.5 per cent by weight of sulfur in the final resinous product. The total amount of metal compound employed, that is, the amount of alkaline earth metal sulfide plus alkaline earth metal hydroxide remains in the proportion of at least one equivalent of total metal compound for every two mols of the phenol.

The resinous products obtained in accordance with this invention are excellent additives for various mineral oil compositions and the invention also includes such compositions.

In preparing the resins of our invention, it is necessary not to permit substantial reaction between the phenol and formaldehyde in the absence of the alkaline earth metal sulfide and the alkaline earth metal hydroxide, if the hydroxide is employed. Accordingly, it is preferred to mix all of the ingredients and react them simultaneously. However, the alkaline earth metal sulfide and formaldehyde, with or without the hydroxide, can first be mixed and partially reacted followed by addition of the phenol to the reaction mass and further reaction; or the alkaline earth metal sulfide and phenol, with or without the hydroxide, can first be reacted followed by reaction with the formaldehyde.

The condensation reaction of our invention takes place spontaneously at room temperature, but it is preferred to employ moderately elevated temperatures in order to obtain reasonably rapid reaction rates. When the reaction sequence of first reacting the phenol and alkaline earth metal sulfide and then reacting the formaldehyde is followed, the phenol and alkaline earth metal sulfide, with or without the hydroxide, can be reacted first at temperatures as high as 400° F. Thereafter, for the subsequent reaction with formaldehyde, the reaction mass is cooled to, say, 120° F. to 180° F. to avoid excessive volatilization of formaldehyde. In any instance where formaldehyde is present in the reacting mass, whether initially or otherwise, it is desirable not to exceed a reaction temperature of about 200–210° F. in order to avoid loss of formaldehyde, although this loss can be reduced to some extent when employing temperatures higher than about 210° F. by the use of closed reaction vessels.

Since the formaldehyde is most conveniently used in the form of commercial aqueous formalin, containing 37 per cent by weight of formaldehyde, sufficient water for the reaction is generally contained in the formalin solution. However, the alkaline earth metal sulfides and the alkaline earth metal hydroxides may be conveniently dispersed in water to form an aqueous slurry even when formalin is used.

In order to obtain the oil-soluble metal and sulfur-containing resins of our invention at least one mol of formaldehyde must be used for every two mols of the phenol. Amounts of formaldehyde less than this tend to yield oil-insoluble resins. Amounts of formaldehyde in excess of the amounts stated can be employed since any formaldehyde in excess of the amount reacted is either volatilized off in the reaction or in the subsequent dehydration of the resin.

When an alkaline earth metal hydroxide is employed in place of some of the alkaline earth metal sulfide, it is necessary to use such an amount of hydroxide that the sulfur content of the resulting resin, which is derived of course from the alkaline earth metal sulfide, does not fall below about 0.5 per cent by weight. This amount of sulfur in the product gives more effective bearing corrosion inhibiting properties to a mineral lubricating oil compounded with the product than can be obtained with smaller amounts of sulfur. At the same time, the use of an alkaline earth metal hydroxide along with the sulfide in accordance with our invention insures the obtaining of an additive which does not objectionably stain or blacken silver bearing metals when incorporated in a mineral lubricating oil. In general, in order to obtain the desired minimum amounts of sulfur in the product while avoiding objectionable blackening of silver bearing metals, it is preferred that the relative molar proportions of alkaline earth metal sulfide to alkaline earth metal hydroxide should be about 1:1. The use of an alkaline earth metal monosulfide is also preferred. It should be understood, however, that the relative proportions stated are approximate and will vary, depending on whether a monosulfide or polysulfide is employed. It should be further understood that the total amount of metal compound, that is, alkaline earth metal sulfide, with or without an alkaline earth metal hydroxide, is employed in the proportion of at least one equivalent of metal compound for every two mols of the phenol.

After the condensation reaction described above is completed, the temperature is raised to distill off all water, both that formed in the condensation and added with the reactants, to dehydrate the product. This or any other dehydration step conventional in the formation of resinous phenol-formaldehyde condensation products can be employed. Although the condensation reaction can be carried out solely in an aqueous medium, when the resinous product is to be used as a mineral oil additive, it is advantageous to use additionally a light naphtha solvent or a mineral lubricating oil of the same general type as the oil to which the resin is to be added. There is then obtained, after dehydration, a concentrate of the resin in solution in the naphtha or mineral lubricating oil as the case may be.

The phenolic compounds employed in preparing our new resins are alkylated monohydric phenols having at least one alkyl group of at least four carbon atoms. As will be understood by those skilled in the art, such phenols must have at least one reactive position in the nucleus which is free of substituents. The presence of at least one alkyl group of at least four carbon atoms in the phenol insures oil solubility of the resinous condensation products prepared therefrom. Phenols not containing such groups tend to yield products which are insoluble in mineral lubricating oils.

The alkylated phenols can readily be prepared by alkylating phenol or the simple monohydric homologues thereof, such as the naphthols, cresols, and ethyl and propyl phenols, with an alkyl halide or an alkanol in the presence of a Friedel-Crafts catalyst. Alternatively, alkylation can be performed with an olefin in the presence of concentrated sulfuric acid as a catalyst. The alkyl halides, alkanols and olefins employed in these alkylation reactions contain at least four carbon atoms and are selected to yield such alkyl radicals as butyl, amyl, heptyl, octyl, nonyl, decyl, stearyl and cetyl. The long chain groups derived from paraffin wax are also suitable; these yield the so-called "wax" phenols. Alkyl substituents containing from four to twelve carbon atoms form a preferred class. The alkylation reactions described are conventional and need not be further elaborated here.

Representative alkyl phenols of the class described include n-butyl phenol; sec-butyl phenol; tert-butyl phenol; 2-tert-butyl, 4-methyl phenol; 2,4-di-tert-butyl phenol; 2,6-di-tert-butyl phenol; 2-tert-butyl, 4-ethyl phenol; n-amyl phenol; di-tert-amyl phenol; hexyl phenols; heptyl phenols; n-octyl phenol; iso-octyl phenol (alpha, alpha, gamma, gamma tetramethylbutyl phenol); nonyl phenol; decyl phenol; tri-isobutyl phenol; "wax" phenols; etc. Particularly good results have been obtained with tetramethylbutyl phenol.

The alkaline earth metal sulfides contemplated by this invention include the mono- and polysulfides of calcium, barium, strontium and magnesium. Because of their relative cheapness and availability, calcium sulfide and barium sulfide are preferred. Similarly, when an alkaline earth metal hydroxide is employed, the hydroxides or corresponding oxides of calcium, barium, strontium, and magnesium are suitable.

The following examples are illustrative of the preparation of our alkaline earth metal and sulfur containing resinous products.

*Example I.*—Into an enamel lined reaction vessel were charged 1 mol of calcium sulfide with sufficient water to make a slurry. There was then added 2 mols of formaldehyde in the form of a 37 per cent by weight aqueous solution. These materials were heated to a temperature of 100° F. for one hour and thereafter the mixture was added to a solution of 2 mols of tetramethylbutyl phenol in a mineral lubricating oil having a viscosity of 100 SUS at 100° F. The mixture was then agitated for a period of one hour at a temperature of 160° F. The condensation product formed by the reaction was dehydrated by raising the temperature to 280° F., distilling off all water, both that were added with the reactants and formed in the reaction. The mineral oil solution of the resin thus prepared had the following properties:

| | |
|---|---|
| Gravity, °API | 19.2 |
| Viscosity, SUS: | |
| 100° F | 2,436 |
| 210° F | 119 |
| Color, ASTM union | 4.25 |
| Sulfur, per cent | 1.72 |
| Neutralization No | 23.52 alk. |
| Ash, per cent | 3.44 |

*Example II.*—Example I was repeated, except that 1 mol of barium sulfide was employed in place of the calcium sulfide. The solution of the resulting resinous product in mineral oil had the following properties:

| | |
|---|---|
| Gravity, °API | 18.9 |
| Viscosity, SUS: | |
| 100° F | 2,380 |
| Color, ASTM union | 4.5 |

*Example III.*—Into a reaction vessel equipped for heating, cooling and stirring there were charged 840 parts by weight of tetramethylbutyl phenol and 340 parts by weight of barium sulfide. The mixture was agitated and heated to 350° F. for two hours. It was then cooled to 160° F., 340 parts by weight of a 37 per cent by weight aqueous solution of formaldehyde were slowly added, and the mixture agitated at 180° F. for half hour. With continued agitation, the temperature was raised to 300° F. to distill off all water. The residue was then cooled to 160° F. and 3000 parts by weight of Stoddard solvent were added. The resulting solution was filtered and the filtrate charged into a vacuum still where the solvent was distilled off under a vacuum of 375 mm. at a maximum pot temperature of 300° F. The residue was then placed into an evaporating dish and heated with agitation in an atmosphere of carbon dioxide to 400° F. to remove all traces of solvent. The reaction product had the following properties:

| | |
|---|---|
| Color | Red amber |
| Sp. Gr., 77° F./60° F | 1.0315 |
| Sulfur, per cent | 1.60 |
| Ash as sulfate, per cent | 25.4 |
| Melting point, °F | 180 |

*Example IV.*—Into a reaction vessel there were charged 840 parts by weight of tetramethylbutyl phenol and 466 parts by weight of barium trisulfide in an aqueous solution. The mixture was heated with agitation to 350° F. and held at that temperature for one hour. The mixture was then cooled to 160° F., 1100 parts by weight of a 70 SUS at 100° F. lubricating oil were added, and then 340 parts by weight of formalin were added. The temperature was then raised to 180° F. and maintained there for half an hour after which the temperature was raised to 300° F. to dehydrate the product. A second portion of 1100 parts by weight of the same lubricating oil was added and the resulting solution was filtered through diatomaceous earth. The additive concentrate in the lubricating oil had the following properties:

| | |
|---|---|
| Gravity, °API | 9.9 |
| Viscosity, SUS: | |
| 210° F | 74 |
| Color, ASTM union | 6.5 |
| Ash as sulfate, per cent | 10.29 |
| Sulfur, B, per cent | 2.51 |
| Neutralization value: | |
| ASTM D974–48T— | |
| Total base No | 24.3 |

*Example V.*—Into a reaction vessel there were charged 840 parts by weight of tetramethylbutyl phenol, 1000 parts by weight of the same lubricating oil used in the preceding example and 144 parts by weight of calcium sulfide. With agitation, the mixture was heated to 220° F., at which point 100 parts by weight of water were slowly added. With continued agitation, the mixture was heated to 350° F. and maintained there for one hour. After cooling to 160° F., 340 parts by weight of formalin were added and the temperature maintained at 160° F. for half an hour. The product was then diluted with an additional 1000 parts by weight of the same lubricating oil and the temperature raised to 300° F. to dehydrate the product. The solution of the additive in the mineral oil was then filtered through diatomaceous earth. The filtrate had the following properties:

| | |
|---|---|
| Gravity, ° API | 22.3 |
| Viscosity, SUS: | |
| 210° F | 59.8 |
| Color, ASTM union | 5.0 |
| Sulfur, B, per cent | 0.89 |
| Ash as sulfate, per cent | 6.09 |
| Neutralization value: | |
| ASTM D974–48T— | |
| Total base No | nil |

*Example VI.*—Eight hundred and forty (840) parts by weight of tetramethylbutyl phenol, 1000 parts by weight of the light lubricating oil used in Example IV and 338 parts by weight of barium sulfide were charged into a reaction vessel. With agitation, the mixture was heated to 220° F., at which point 150 parts by weight of water were slowly added. Agitation was continued and the mixture was heated to 350° F. and held at that temperature for an hour. After cooling to 160° F., 340 parts by weight of formalin were added and the mixture heated to 180° F. and held at that temperature for half an hour with agitation. The reaction product was then heated to 300° F. to dehydrate it, following which 1100 parts by weight of the same light lubricating oil were added. The resulting solution was then filtered through diatomaceous earth. The concentrated additive solution obtained had the following properties:

| | |
|---|---|
| Gravity, ° API | 14.9 |
| Viscosity, SUS: | |
| 210° F | 99.1 |
| Color, ASTM union | 5.5 |
| Sulfur, B, per cent | 0.84 |
| Ash as sulfate, per cent | 10.44 |
| Neutralization value: | |
| ASTM D974–48T— | |
| Total base No | 20.1 |

*Example VII.*—Into a reaction vessel there were charged 840 parts by weight of tetramethylbutyl phenol, 1000 parts by weight of a 70 SUS at 100° F. lubricating oil, 175 parts by weight of barium sulfide and 74 parts by weight of calcium hydroxide. Sufficient heat was applied to melt the phenol and then 354 parts by weight of formalin were slowly added while maintaining a temperature of 160° F. The temperature was held at 160° F. for half an hour and then slowly raised to 310° F. and maintained at this temperature for fifteen minutes under a partial vacuum to dehydrate the product. There was then added an additional 1000 parts by weight of the same lubricating oil and the mixture was filtered through diatomaceous earth. The additive concentrate obtained had the following properties:

| | |
|---|---|
| Gravity, ° API | 16.0 |
| Viscosity, SUS: | |
| 100° F | 1,000 |
| 210° F | 75.2 |
| Color, ASTM union | 4.0 |
| Sulfur, B, per cent | 0.71 |
| Ash as sulfate, per cent | 10.15 |

While the above examples have illustrated the use of tetramethylbutyl phenol, the preferred phenol, other monohydric alkylated phenols, as disclosed herein, can be used with good results. Similarly, other alkaline earth metal sulfides and other alkaline earth metal hydroxides can be employed in place of those shown in the examples.

The metal and sulfur containing resinous products of our invention are excellent addition agents for various mineral oils. They are readily soluble in all types of mineral lubricating oils, that is, paraffinic, naphthenic or mixed base oils and can be blended with them in high proportions. This excellent solubility of our new products enables the preparation of concentrated solutions thereof, as shown in the foregoing examples, which may then be diluted with additional oil to the proportions desired in the final mineral oil composition. These new addition agents confer excellent detergent effects and rust inhibiting properties on the mineral lubricating oils with which they are incorporated, and generally confer excellent bearing corrosion inhibiting properties on the oils containing them. For these purposes, our new addition agents are usually added to mineral lubricating oils in minor amounts, say from about 0.1 to about 25 per cent by weight of the oil, sufficient to confer improved detergent properties on the oils with which they are incorporated. Generally, the addition of about 1 to 2 per cent by weight of our new resins is sufficient to effect the desired improvement, but for heavy duty applications larger amounts are employed.

Our new resins can also be added to mineral oil lubricant greases, that is, mineral lubricating oils thickened to the consistency of a grease by a suitable soap. Our new resins thereby improve the stability of the grease by increasing its resistance to oxidation. In general, small amounts of our resins, say from 0.1 to 5 per cent by weight on the grease, sufficient to retard oxidation of the grease, will suffice. As is known in the art, the mineral oils used as bases in manufacturing greases include paraffinic, naphthenic and mixed base mineral lubricating oils. The soaps used in thickening the mineral oil base to a grease are fatty acid soaps derived from fatty materials such as tallow, lard, cottonseed oil, stearic acid, hydrogenated fish oil fatty acids and various other fats and fatty acids. The metal of the soaps can be an alkali metal, an alkaline earth metal, and various other metals such as lead, zinc, chromium, tin, aluminum, nickel, cadmium, etc. As will be understood by those skilled in the art, the soap and mineral oil base will be selected in accordance with the specific properties of the grease it is desired to manufacture.

Our new resins are not only useful in mineral oil lubricants but can be added to various mineral oils and compositions thereof to improve them in one or more respects. Thus, our new resins can be added to gasolines to retard haze formation and to distillate fuel oils to retard sludge formation. Because of their rust inhibiting properties, our new resins can be added to various volatile and non-volatile petroleum solvents and compositions to obtain improved coating compositions and slushing oils. For the stabilization of fuels such as gasoline, diesel fuels and distillate furnace oils, small amounts as low as 0.001 per cent by weight of our resins can be employed, but somewhat larger amounts, from 0.01 to 5 percent by weight are preferable. Even larger amounts can be used, if desired, without harmful effect. The amount of resin to be used for the preparation of coating compositions containing mineral oils will vary with the nature of the coating required, but in general from about 0.1 to about 25 per cent of the resin will give satisfactory results.

From the foregoing it will be observed that the new resins of our invention are added to mineral oils in amounts ranging from 0.001 to 25 per cent by weight, depending on the nature of the mineral oil and the improvement desired, as will be apparent to those skilled in the art.

The following examples illustrate the use of our new resinous products to obtain improved mineral oil compositions.

*Example VIII.*—A motor lubricating oil SAE 30 was blended with 2 per cent by volume of the additive prepared according to Example I. A comparison of the properties of the base oil and the improved oil follows:

|  | Base Oil | Improved Oil |
|---|---|---|
| Gravity, ° API | 29.1 | 27.9 |
| Viscosity, SUS: |  |  |
| 210° F | 67.5 | 151.1 |
| Color, ASTM Union | 2.0 | 2.5 |
| Sulfur, B, percent | 0.10 | 0.2 |
| Neutralization No | nil | 0.21 alk. |
| Ash as Sulfate, percent |  | 0.07 |
| Engine Test, CRC L-4: |  |  |
| Engine Condition Rating |  | 90 |
| Bearing Loss, Mg./Whole Bearing |  | 28 |

*Example IX.*—The same highly refined lubricating oil base of Example VIII was blended with 2 per cent by weight of the additive prepared according to Example III. The properties of the improved oil were as follows:

|  | Improved oil |
|---|---|
| Gravity, ° API | 29.2 |
| Viscosity, SUS: |  |
| 210° F. | 70.0 |
| Color ASTM union | 2.5 |
| Neutralization value: |  |
| ASTM D 974-48T— |  |
| Total base No. | 0.11 |
| Ash as sulfate, percent | 0.50 |
| Engine test, CRC L-4: |  |
| Engine condition rating | 95 |
| Bearing loss, mg./whole bearing | 40 |

*Example X.*—The same highly refined lubricating oil base of Example VIII was blended with 6 per cent by volume of the additive concentrate prepared according to Example IV. The properties of the improved oil were as follows:

|  | Improved oil |
|---|---|
| Gravity, ° API | 28.7 |
| Viscosity, SUS: |  |
| 210° F. | 69.0 |
| Color, ASTM union | 2.75 |
| Neutralization value: |  |
| ASTM D 974-48T— |  |
| Total base No. | 0.31 |
| Ash as sulfate, percent | 0.61 |
| Engine test, CRC L-4: |  |
| Engine condition rating | 92 |
| Bearing loss, mg./whole bearing | 114 |

*Example XI.*—A highly refined lubricating oil was blended with 6 per cent by volume of the additive concentrate prepared according to Example V. A comparison of the base oil and the improved oil showed:

|  | Base Oil | Improved Oil |
|---|---|---|
| Gravity, ° API | 24.8 | 23.7 |
| Viscosity, SUS: |  |  |
| 100° F | 1,218 | 1,203 |
| 210° F | 84.6 | 84.3 |
| Color, ASTM Union | 3.25 | 4.25 |
| Neutralization Value: |  |  |
| ASTM D 974-48T— |  |  |
| Total Base No | nil | nil |
| Ash as Sulfate, percent | nil | 0.65 |
| Engine Test, CRC L-4: |  |  |
| Engine Condition Rating |  | 96 |
| Bearing Loss, Mg./Whole Bearing |  | 121 |

*Example XII.*—The same highly refined lubricating oil base of Example VIII was blended with 6 per cent by volume of the additive prepared according to Example VI. The properties of the improved oil were as follows:

|  | Improved oil |
|---|---|
| Gravity, ° API | 28.6 |
| Viscosity, SUS: |  |
| 210° F. | 68.6 |
| Color, ASTM union | 2.75 |
| Neutralization value: |  |
| ASTM D 974-48T— |  |
| Total base No. | 0.20 |
| Ash as sulfate, percent | 0.66 |
| Engine test, CRC L-4: |  |
| Engine condition rating | 94 |
| Bearing loss, mg./whole bearing | 25 |

*Example XIII.*—A highly refined lubricating oil was blended with 9 per cent by volume of the additive concentrate prepared according to Example VII. A comparison of the base oil and the improved oil showed:

|  | Base Oil | Improved Oil |
|---|---|---|
| Gravity, °API | 23.7 | 23.0 |
| Viscosity, SUS: |  |  |
| 100° F | 1,250 | 1,187 |
| 210° F | 84.2 | 81.2 |
| Color, ASTM Union | 3.25 | 5 |
| Corrosion Test, EMD L. O. 201-47: |  |  |
| Silver Plated Strip— |  |  |
| Wt. Change, Grams |  | 0.0002 |
| Appearance |  | Light stain |
| Engine Test, CRC L-4: |  |  |
| Over-all Rating |  | 9-97-51 |

The haze-inhibiting effect of the resins of our invention in gasoline is shown in the following table wherein the additives of Examples III, IV, V and VI were added to a finished leaded gasoline in the proportion of 40 pounds of resin (dry basis) per 1000 barrels of gasoline.

|  | Base Gasoline | Additive of Ex. III | Additive of Ex. IV | Additive of Ex. V | Additive of Ex. VI |
|---|---|---|---|---|---|
| Gravity, °API | 62.0 | 62.1 | 62.1 | 62.2 | 62.2 |
| TEL, Ml./Gal | 2.0 | 2.0 | 2.0 | 2.0 | 2.0 |
| Doctor | good | good | good | good | good |
| Copper Strip Test, 210° F., 3 hrs. | passes | passes | passes | passes | passes |
| Oxygen Stability: |  |  |  |  |  |
| ASTM D 525-49 | 240+ | 240+ | 240+ | 240+ | 240+ |
| U-V Light Stability Test, Min. to precipitate | 15 | 60 | 55 | 75 | 90 |

The antioxidant effect of our new resins in greases is shown in the following table wherein the resins of Examples IV, V and VI were added in an amount of 1.5 per cent by weight (dry basis) to a soda-tallow and stearic acid base grease.

|  | Base Grease | Additive of Ex. IV | Additive of Ex. V | Additive of Ex. VI |
|---|---|---|---|---|
| Melting Point, °F.: |  |  |  |  |
| Hawxhurst | 301 | 305 | 305 | 306 |
| Oxidation Stability: |  |  |  |  |
| ASTM D942-50— |  |  |  |  |
| Pressure Drop, Lbs./Sq. In | 5 | 4 | 5 | 4 |
| Hours | 16 | 100 | 100 | 100 |

As shown in the above examples our new addition agents confer effective detergent properties on mineral lubricating oils. Thus, the over-all rating and the engine condition ratings shown under the CRC, L-4 engine tests indicate the freedom from engine deposits obtained. As shown by the data under bearing loss in these tests, which indicate the amount of bearing corrosion expressed in milligrams loss in weight of a standard bearing, the new resins tested confer excellent bearing corrosion inhibiting properties.

As shown under the U-V light stability test for gasoline compositions containing the resins of our invention, a marked retardation in haze formation is obtained. Furthermore, as shown in the testing of greases containing our new resins, a marked improvement in the oxidation stability of such greases is obtained.

While we have shown in the examples mineral oil compositions containing certain resins, our invention is not to be taken as limited to such specific resins, but comprises all of such materials within the purview of this disclosure.

Furthermore, the invention is not to be limited to the use of our metal and sulfur containing resins in the preparation of compounded lubricating oils, but comprises all mineral oil lubricants containing our new agents, such as greases and the like. As is known in the lubricating art, other additives in addition to the resins of our invention can be employed. These are materials such as pour point depressants, viscosity index improvers, antifoam agents, coloring materials, thickeners and the like. Furthermore, as has been shown hereinabove, our new resins can be added to a wide variety of mineral oils including lubricating oils, gasoline, distillate fuels, furnace oils, light naphthas, slushing oils, etc. with beneficial effects.

Resort may be had to such modifications and variations as fall within the spirit of the invention and the scope of the appended claims.

We claim:

1. The process of preparing an oil soluble, metal and sulfur containing, permanently thermoplastic, resinous condensation product which comprises condensing in an aqueous medium reactants consisting essentially of formaldehyde, an alkaline earth metal sulfide and an alkylated monohydric phenol having at least one free reactive position in the nucleus and at least one alkyl group containing at least 4 carbon atoms, at least one mol of formaldehyde being employed for every two mols of the phenol, and at least one equivalent of alkaline earth metal sulfide being employed for every two mols of the phenol, the condensation being conducted to avoid any substantial reaction between the phenol and formaldehyde in the absence of the alkaline earth metal sulfide.

2. The process of claim 1, wherein the condensation is carried out in a mineral oil, and there is recovered a solution of the metal and sulfur containing resinous reaction product in the mineral oil.

3. The process of claim 1, wherein the alkyl group of the alkylated monohydric phenol contains from 4 to 12 carbon atoms.

4. The process of claim 1, wherein the alkaline earth metal sulfide is calcium sulfide and the phenol is tetramethylbutyl phenol.

5. The process of claim 1, wherein the alkaline earth metal sulfide is barium sulfide and the phenol is tetramethylbutyl phenol.

6. The process of preparing an oil soluble, metal and sulfur containing, permanently thermoplastic, resinous condensation product which comprises condensing in an aqueous medium reactants consisting essentially of formaldehyde, an alkaline earth metal sulfide, a compound from the group consisting of an alkaline earth metal hydroxide and an alkaline earth metal oxide, and an alkylated monohydric phenol having at least one free reactive position in the nucleus and at least one alkyl group containing at least 4 carbon atoms; at least one mol of formaldehyde being employed for every two mols of the phenol, the relative amounts of sulfide and hydroxide or oxide being such as to yield a resin containing at least about 0.5 per cent by weight of sulfur, and at least one equivalent of the total of sulfide and hydroxide or oxide being employed for every two mols of the phenol, the condensation being conducted to avoid any substantial reaction between the phenol and formaldehyde in the absence of the alkaline earth metal sulfide and hydroxide or oxide.

7. The process of claim 6, wherein the alkaline earth metal sulfide and alkaline earth metal hydroxide are in the relative molar proportions of 1:1.

8. The process of claim 6, wherein the alkaline earth metal sulfide is barium sulfide, the alkaline earth metal hydroxide is calcium hydroxide, and the phenol is tetramethylbutyl phenol.

References Cited in the file of this patent

UNITED STATES PATENTS

| | | |
|---|---|---|
| 2,342,099 | Ashley | Feb. 22, 1944 |
| 2,361,804 | Wilson | Oct. 31, 1944 |
| 2,377,955 | Mixon | June 12, 1945 |
| 2,619,459 | Neff | Nov. 25, 1952 |
| 2,619,460 | Neff | Nov. 25, 1952 |